United States Patent
Yamamoto et al.

(10) Patent No.: US 11,954,298 B2
(45) Date of Patent: Apr. 9, 2024

(54) INFORMATION PROCESSING APPARATUS DISPLAYING CONTROL MANIPULATION TARGET IN AN EMPHASIZED MANNER

(71) Applicant: Sony Interactive Entertainment Inc., Tokyo (JP)

(72) Inventors: Toru Yamamoto, Tokyo (JP); Yasuyuki Suki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 25 days.

(21) Appl. No.: 17/413,709

(22) PCT Filed: Dec. 16, 2019

(86) PCT No.: PCT/JP2019/049215
§ 371 (c)(1),
(2) Date: Jun. 14, 2021

(87) PCT Pub. No.: WO2020/129908
PCT Pub. Date: Jun. 25, 2020

(65) Prior Publication Data
US 2022/0019319 A1 Jan. 20, 2022

Related U.S. Application Data
(60) Provisional application No. 62/781,013, filed on Dec. 18, 2018.

(51) Int. Cl.
*G06F 3/0481* (2022.01)
*A63F 13/00* (2014.01)
(Continued)

(52) U.S. Cl.
CPC ............ *G06F 3/0481* (2013.01); *A63F 13/00* (2013.01); *G06F 3/048* (2013.01); *G06F 3/04886* (2013.01); *G06F 2203/04803* (2013.01)

(58) Field of Classification Search
CPC .... G06F 3/0481; G06F 3/048; G06F 3/04886; G06F 2203/04803; G06F 3/04817; A63F 13/00; A63F 13/23; A63F 13/537
See application file for complete search history.

(56) References Cited

U.S. PATENT DOCUMENTS

| 8,276,073 B2 | 9/2012 | Okamoto |
| 8,542,192 B2 | 9/2013 | Onda |

(Continued)

FOREIGN PATENT DOCUMENTS

| JP | 2002215284 A | 7/2002 |
| JP | 2008217131 A | 9/2008 |
| WO | 2008093784 A1 | 8/2008 |

OTHER PUBLICATIONS

International Preliminary Report on Patentability and Written Opinion for corresponding PCT Application No. PCT/JP2019/049215, 15 pages, dated Jul. 1, 2021.

(Continued)

*Primary Examiner* — Ting Z Lee
(74) *Attorney, Agent, or Firm* — Matthew B. Dernier, Esq.

(57) ABSTRACT

An information processing apparatus displays a main screen image including a main content, displays a sub-screen image including a sub-content of a kind different from a kind of the main content in a time period same as the main screen image, receives a switchover manipulation from a mode in which a manipulation for the main screen image is received over to a mode in which a manipulation for the sub-screen image is received, and displays the sub-screen image in an emphasized manner when a switchover to the mode in which the manipulation for the sub-screen image is received is performed.

8 Claims, 6 Drawing Sheets

(51) Int. Cl.
    *G06F 3/048*     (2013.01)
    *G06F 3/04886*     (2022.01)

(56) References Cited

U.S. PATENT DOCUMENTS

| | | | | |
|---|---|---|---|---|
| 10,664,122 | B2* | 5/2020 | Choi | G06F 3/0481 |
| 2009/0172596 | A1* | 7/2009 | Yamashita | H04N 21/4312 |
| | | | | 715/834 |
| 2010/0005414 | A1* | 1/2010 | Ishiguro | G06F 3/04892 |
| | | | | 715/802 |
| 2010/0058192 | A1 | 3/2010 | Okamoto | |
| 2010/0149102 | A1 | 6/2010 | Onda | |
| 2010/0292010 | A1* | 11/2010 | Kira | A63F 13/5375 |
| | | | | 463/43 |
| 2012/0290972 | A1* | 11/2012 | Yook | G06F 9/451 |
| | | | | 715/781 |
| 2012/0299815 | A1* | 11/2012 | Kim | H04N 21/441 |
| | | | | 345/156 |
| 2013/0009983 | A1* | 1/2013 | Ishitsuka | H04N 1/00453 |
| | | | | 345/619 |
| 2015/0220215 | A1* | 8/2015 | Choi | G06F 3/0481 |
| | | | | 715/800 |
| 2016/0170709 | A1* | 6/2016 | Jang | H04N 21/47205 |
| | | | | 715/727 |

OTHER PUBLICATIONS

International Search Report for corresponding PCT Application No. PCT/JP2019/049215, 4 pages, dated Mar. 17, 2020.

* cited by examiner

INFORMATION PROCESSING APPARATUS DISPLAYING CONTROL MANIPULATION TARGET IN AN EMPHASIZED MANNER

TECHNICAL FIELD

The present invention relates to an information processing apparatus receiving a manipulation input from a user, an information processing method, and a program.

BACKGROUND ART

For example, like a technology called picture-in-picture, another kind of sub-content is displayed together with a main content within a display area of the same display apparatus in some cases.

SUMMARY

Technical Problem

In a case where a plurality of kinds of contents are displayed in the same time period in such a manner, a user performs a manipulation input for each of the contents while switching a manipulation target from one content to another. In such a case, it is sometimes difficult for the user to understand which content is the current manipulation target.

The present invention has been made in consideration of the above circumstances, and it is one of objects of the present invention to provide an information processing apparatus, an information processing method, and a program that enables a content as a manipulation target to be conspicuous in a case where a plurality of kinds of contents are switched from one to another to be a manipulation target.

Solution to Problem

An information processing apparatus according to one aspect of the present invention includes a main screen image display control section that displays a main screen image including a main content, a sub-screen image display control section that displays a sub-screen image including a sub-content of a kind different from a kind of the main content in a time period same as the main screen image, and a manipulation receiving section that receives a switchover manipulation from a mode in which a manipulation for the main screen image is received over to a mode in which a manipulation for the sub-screen image is received. When a switchover to the mode in which the manipulation for the sub-screen image is received is performed, the sub-screen image display control section displays the sub-screen image in an emphasized manner.

An information processing method according to one aspect of the present invention includes a step of displaying a main screen image including a main content, a step of displaying a sub-screen image including a sub-content of a kind different from a kind of the main content in a time period same as the main screen image, a step of receiving a switchover manipulation from a mode in which a manipulation for the main screen image is received over to a mode in which a manipulation for the sub-screen image is received, and a step of displaying the sub-screen image in an emphasized manner when a switchover to the mode in which the manipulation for the sub-screen image is received is performed.

A program according to one aspect of the present invention is a program for causing a computer to execute a step of displaying a main screen image including a main content, a step of displaying a sub-screen image including a sub-content of a kind different from a kind of the main content in a time period same as the main screen image, a step of receiving a switchover manipulation from a mode in which a manipulation for the main screen image is received over to a mode in which a manipulation for the sub-screen image is received, and a step of displaying the sub-screen image in an emphasized manner when a switchover to the mode in which the manipulation for the sub-screen image is received is performed. This program may be stored in a computer readable non-transitory information storage medium to be presented.

DESCRIPTION OF EMBODIMENT

Hereinafter, an embodiment of the present invention will be described in detail on the basis of the drawings.

Figure 1:
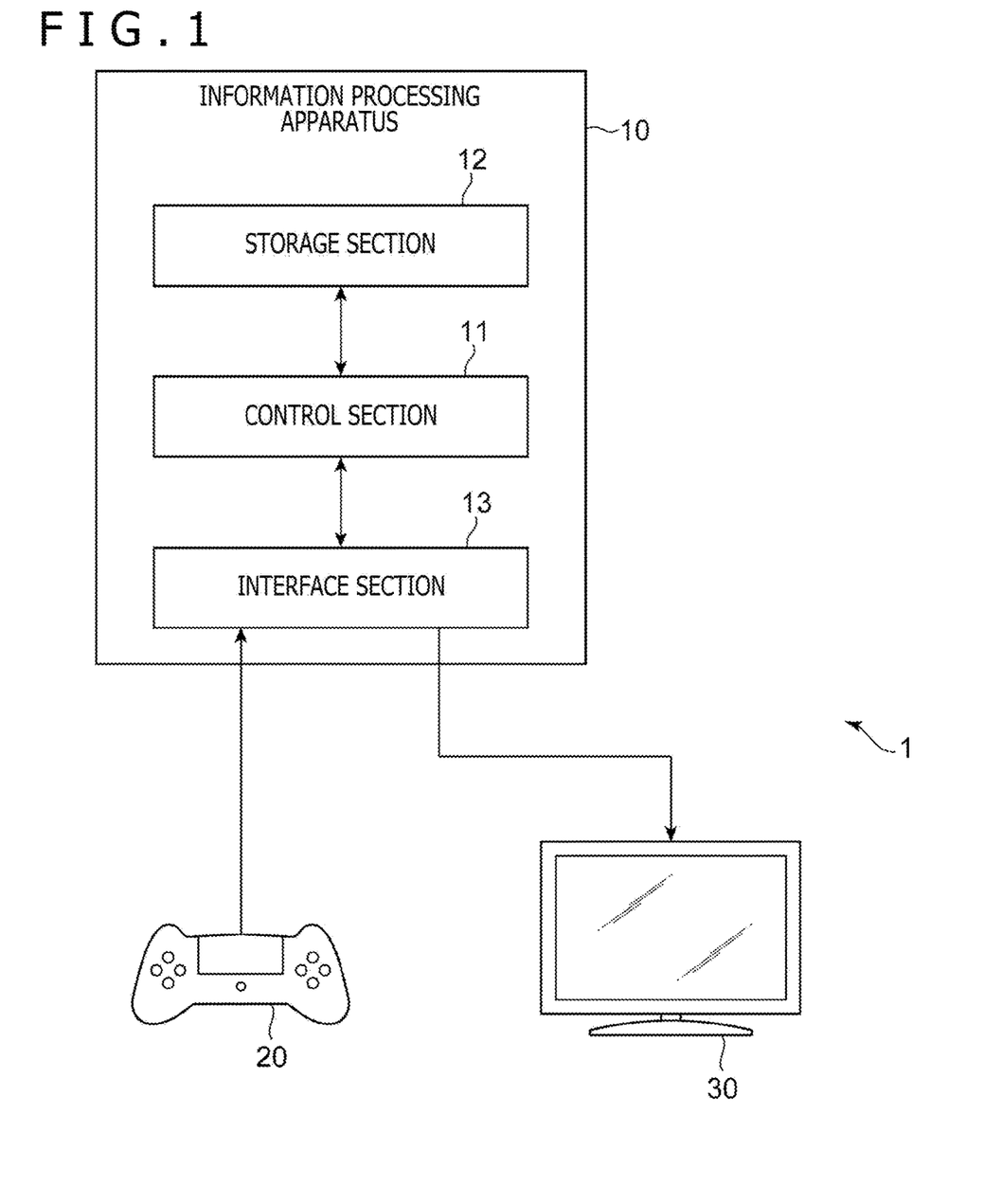
FIG. 1 is a configuration block diagram of an information processing system including an information processing apparatus according to an embodiment of the present invention.

FIG. 1 is a configuration block diagram depicting an overview of an information processing system 1 including an information processing apparatus 10 according to an embodiment of the present invention. As depicted in the figure, the information processing system 1 includes the information processing apparatus 10, a manipulation device 20, and a display apparatus 30.

The information processing apparatus 10 may be, for example, a game machine for home use, a personal computer, or the like. As depicted in FIG. 1, the information processing apparatus 10 includes a control section 11, a storage section 12, and an interface section 13.

The control section 11 includes at least one processor such as a central processing unit (CPU), and executes a program stored in the storage section 12 to execute various kinds of information processing. It is to be noted that a specific example of the processing executed by the control section 11 in the present embodiment will be described later. The storage section 12 includes at least one memory device such as a random access memory (RAM), and stores the program which is to be executed by the control section 11 and data which is to be processed by the program.

The interface section 13 is an interface for data communication with the manipulation device 20 and the display apparatus 30. The information processing apparatus 10 is connected to each of the manipulation device 20 and the display apparatus 30 via the interface section 13 in a wired or wireless manner. Specifically, in order to transmit video data, which the information processing apparatus 10 is to supply, to the display apparatus 30, the interface section 13 includes a multimedia interface such as a high-definition multimedia interface (HDMI: registered trademark). In addition, in order to receive a manipulation signal indicative of the contents of a manipulation made by a user received by the manipulation device 20, the interface section 13 includes a data communication interface such as a universal serial bus (USB).

Figure 2:
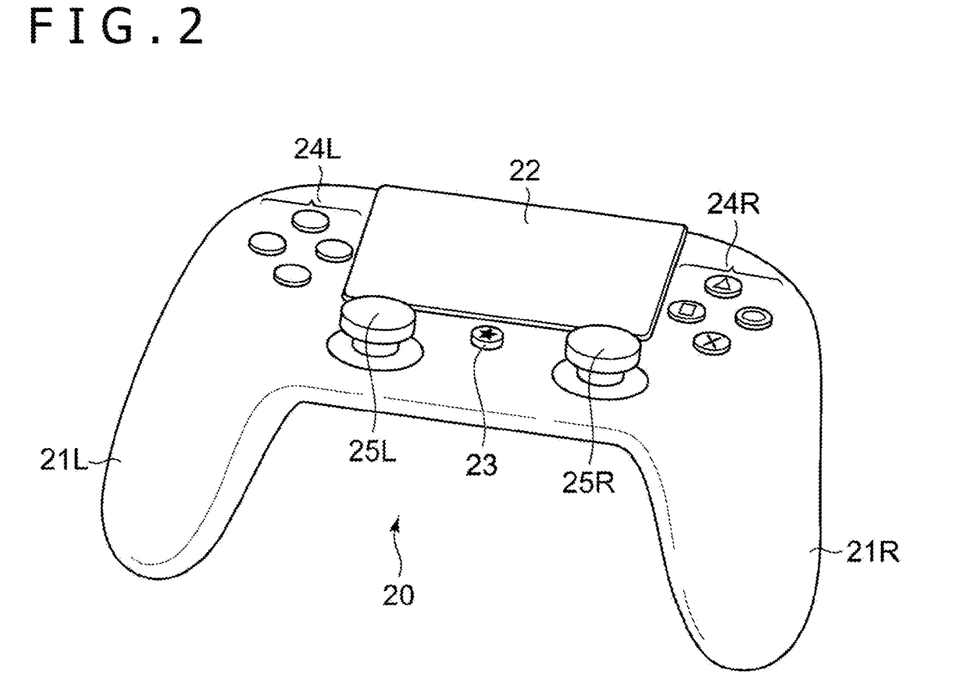
FIG. 2 is a view depicting an example of appearance of a manipulation device.

The manipulation device 20 is a device for receiving a manipulation input by the user. FIG. 2 depicts an example of appearance of the manipulation device 20. In the present embodiment, it is supposed that the user grips and uses the manipulation device 20 with both hands, and grip sections 21L and 21R are respectively formed on left and right sides of a main body of the manipulation device 20. The user uses the manipulation device 20 in a state in which the grip section 21R is gripped with the fingers of the right hand, and the grip section 21L is gripped with the fingers of the left hand.

Various kinds of manipulation members by using which the user performs manipulations with the thumbs are arranged on an upper surface of the manipulation device 20. Specifically, a touch pad 22 is arranged on a back side of the upper surface of the manipulation device 20 when viewed from the user. Incidentally, in the present embodiment, it is supposed that the user performs a manipulation on the touch pad 22 with his/her thumb. A function button 23 for requesting a specific function is arranged on a near side of the upper surface of the manipulation device 20. The user can manipulate the touch pad 22 and the function button 23 with any of the left and right thumbs in a state in which the user grips the manipulation device 20 with both hands. In addition, a plurality of manipulation buttons 24R by using which the user performs a push manipulation with the thumb of the right hand, and an analog stick 25R by using which the user performs a tilting manipulation with the thumb of the right hand are arranged on the right side of the touch pad 22. Likewise, a plurality of manipulation buttons 24L by using which the user performs a push manipulation with the thumb of the left hand, and an analog stick 25L by using which the user performs a tilting manipulation with the thumb of the left hand are arranged on the left side of the touch pad 22. It is to be noted that the manipulation members described so far are not limitative, and various kinds of manipulation members which the user can manipulate may be arranged in the manipulation device 20.

The display apparatus 30 displays a video according to a video signal transmitted from the information processing apparatus 10 and allows the user to view the video. The display apparatus 30 may be a television receiver for home use or the like. Alternatively, the display apparatus 30 may be a head-mounted display which the user wears on his/her head and uses.

Figure 3:
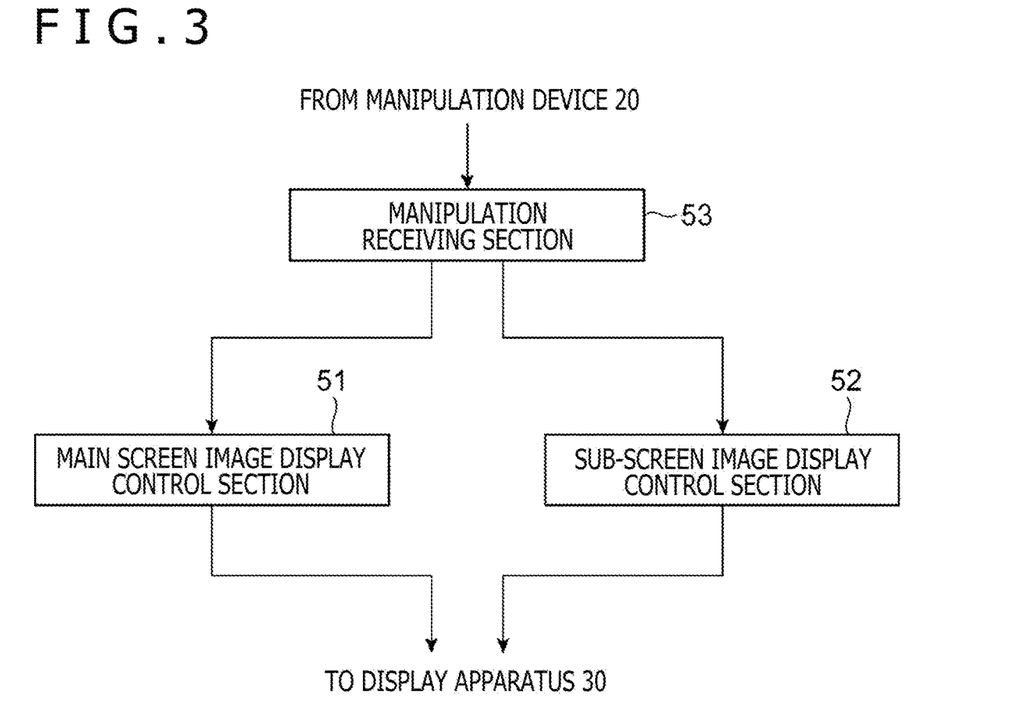
FIG. 3 is a functional block diagram of the information processing apparatus.

Next, a description of functions realized by the information processing apparatus 10 will be given with reference to FIG. 3. As depicted in FIG. 3, the information processing apparatus 10 functionally includes a main screen image display control section 51, a sub-screen image display control section 52, and a manipulation receiving section 53. The control section 11 executes a program stored in the storage section 12, thereby realizing these functions. The program may be provided to the information processing apparatus 10 via a communication network such as the Internet, or may be stored in a computer readable information storage medium such as an optical disc and provided.

The control section 11 executes an application program, thereby realizing the main screen image display control section 51. In the following, the application program executed by the main screen image display control section 51 will be referred to as a main program. Although the main program may be an application program for realizing various kinds of processing, in the following, as a specific example, the main program is a game program. According to the contents of a manipulation input made on the manipulation device 20 by the user, the main screen image display control section 51 executes various kinds of information processing, and causes the execution result to be displayed within a display area of the display apparatus 30. In the following, a content which is displayed on the display apparatus 30 by the main screen image display control section 51 is referred to as a main content. Then, an area in which the main content is displayed within the display area of the display apparatus 30 is described as a main screen image M. In the present embodiment, the main screen image M is normally displayed so as to occupy the whole display area of the display apparatus 30 (i.e., in full screen).

The sub-screen image display control section 52 draws a sub-content of a kind different from that of the main content, and causes the sub-content to be displayed within the display area of the display apparatus 30. The sub-screen image display control section 52 may be realized by a sub-program different from the main program executed by the main screen image display control section 51, or may be realized by the main program similarly to the case of the main screen image display control section 51. In the following, an area in which the sub-content drawn by the sub-screen image display control section 52 is displayed is referred to as a sub-screen image S.

Figure 4:
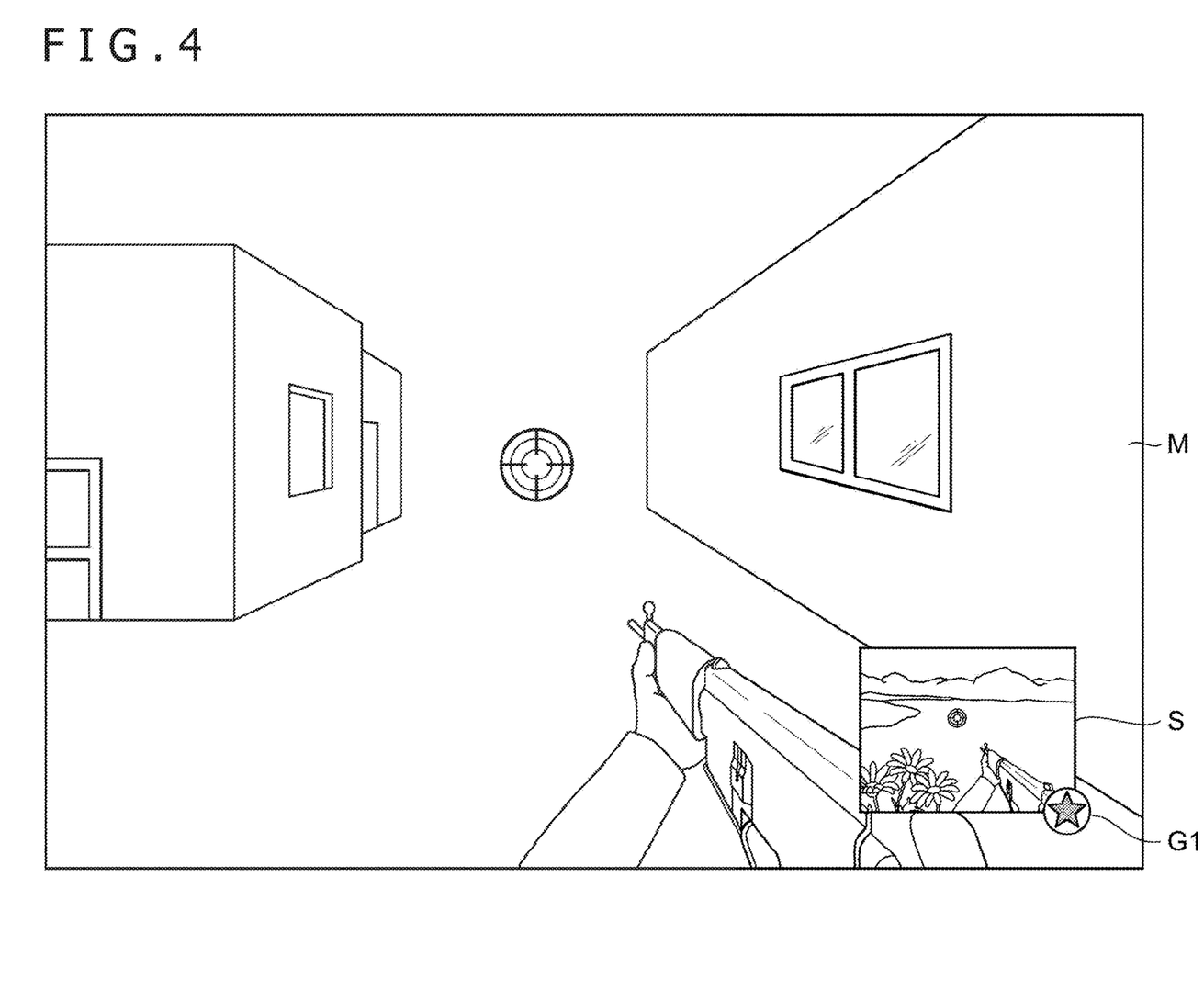
FIG. 4 is a view depicting an example of display in a main screen image mode.

The sub-screen image S is displayed together with the main screen image M within the display area of the display apparatus 30. In the present embodiment, the sub-screen image S is displayed such that it occupies a limited partial area of the display area of the display apparatus 30 and is superimposed on a part of the main screen image M displayed by the main screen image display control section 51. In addition, in this case, as a specific example, the sub-content is a distributed video showing a situation of a game being distributed at that point of time by a third party. The sub-screen image S including such a sub-content is displayed so as to be superimposed on the main screen image M, resulting in that the user can play the game displayed in the main screen image M while viewing the sub-content. FIG. 4 depicts an example of display in which the sub-screen image S is arranged so as to be superimposed on the main screen image M. In the example depicted in this figure, the sub-screen image S is arranged in the vicinity of a bottom right corner of the main screen image M.

The manipulation receiving section 53 receives a manipulation input made on the manipulation device 20 by the user, and outputs the contents of the manipulation input to the main screen image display control section 51, or the sub-screen image display control section 52. In the present embodiment, the information processing apparatus 10 at least operates in any of two kinds of operation modes, i.e., a main screen image mode and a sub-screen image mode, and the manipulation receiving section 53 changes an output destination of the contents of the manipulation made by the user depending on the operation mode at that point of time.

The main screen image mode is a mode in which the manipulation for the main screen image M is received. In the main screen image mode, the manipulation receiving section 53 regards the manipulation inputs made by the user on the manipulation members provided in the manipulation device 20 as manipulations for the main screen image M (hereinafter referred to as game manipulations) except for a previously determined exceptional manipulation, and outputs the contents of the manipulations to the main screen image display control section 51. In the main screen image mode, the user thus can play the game by using the manipulation members provided in the manipulation device 20. It is to be noted that as described above, even in the main screen image mode, the sub-screen image S itself may be displayed together with the main screen image M in the display area of the display apparatus 30.

In contrast, the sub-screen image mode is an operation mode in which the manipulation made by the user for the sub-screen image S can be received. In the sub-screen image mode, the manipulation receiving section 53 regards the manipulation inputs made on the manipulation members provided in the manipulation device 20 as manipulations for the sub-screen image S except for a previously determined exceptional manipulation, and outputs the contents of the manipulations to the sub-screen image display control section 52. It is to be noted that, in any of the modes, the main screen image display control section 51 and the sub-screen image display control section 52 may continue to update the respective screen images. The user thus can play the game displayed in the main screen image M while viewing the video displayed in the sub-screen image S, or can update the display contents of the sub-screen image S while confirming the status of the game in progress in the main screen image M.

The exceptional manipulation in each of the modes described above includes a mode switchover manipulation. The mode switchover manipulation is a manipulation for instructing switchover between the main screen image mode and the sub-screen image mode and, in the present embodiment, is a manipulation of depressing the function button 23. That is, in a case where the user depresses the function button 23 in the main screen image mode, the manipulation receiving section 53 switches the main screen image mode over to the sub-screen image mode and, after the switching, the manipulation receiving section 53 outputs the contents of the manipulation inputs made by the user on the manipulation members other than the function button 23 to the sub-screen image display control section 52. In addition, in a case where the user depresses the function button 23 in the sub-screen image mode, the manipulation receiving section 53 switches the sub-screen image mode over to the main screen image mode and, after the switching, the manipulation receiving section 53 outputs the contents of the manipulation inputs made by the user on the manipulation members other than the function button 23 to the main screen image display control section 51.

In order to present the contents of the mode switchover manipulation to the user, the sub-screen image display control section 52 may display an image representing the manipulation member to which this mode switchover manipulation is allocated (hereinafter, referred to as a switchover manipulation guiding image G1) in association with the sub-screen image S. In the example of FIG. 4, in the main screen image mode, the switchover manipulation guiding image G1 is displayed on an outer circumference of the sub-screen image S (i.e., on a boundary line between the sub-screen image S and the main screen image M) so as to be partially superimposed on the sub-screen image S. The switchover manipulation guiding image G1 may be an image resembling the manipulation member to which the mode switchover manipulation is allocated. In the present embodiment, a mark having a star shape is impressed on the function button 23 of the manipulation device 20 to which the mode switchover manipulation is allocated, and the switchover manipulation guiding image G1 is an image representing the impressed mark.

In addition, the switchover manipulation guiding image G1 may be arranged at a position, on the outer circumference of the sub-screen image S, on a side close to an outer circumference of the main screen image M. In the example of FIG. 4, the sub-screen image S is arranged in the vicinity of the bottom right corner of the main screen image M, and further the switchover manipulation guiding image G1 is arranged at a bottom right corner of the sub-screen image S. In contrast, in a case where the sub-screen image S is arranged in the vicinity of a top left corner of the main screen image M, the switchover manipulation guiding image G1 may also be arranged at a top left corner of the sub-screen image S. If this is the case, the switchover manipulation guiding image G1 is arranged at a position away from the center of the main screen image M, so that the display of the main screen image M is less liable to be disturbed.

Next, a description will be given regarding specific examples of the display in the sub-screen image mode and the manipulation made by the user. In the sub-screen image mode, unlike the main screen image mode, the user can perform a manipulation for changing the arrangement position, the display contents, and the like of the sub-screen image S.

Figure 5:
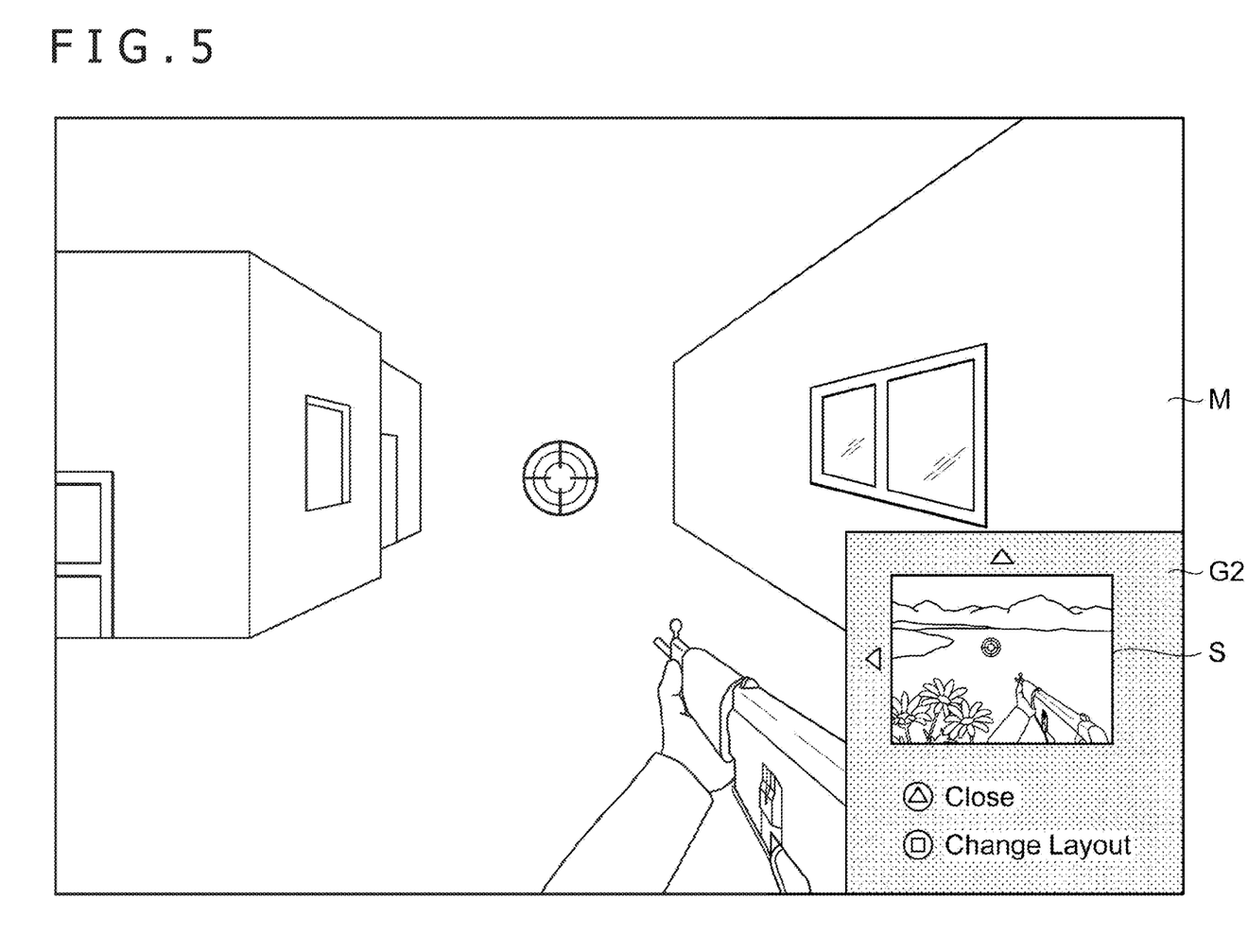
FIG. 5 is a view depicting an example of display in a sub-screen image mode.

When the main screen image mode is switched over to the sub-screen image mode, the sub-screen image display control section 52 first performs the control such that, in order to cause attention of the user to be directed to the sub-screen image S, the sub-screen image S is displayed in an emphasized manner. FIG. 5 depicts an example of display after the user performs the mode switchover manipulation to make transition from the state of the main screen image mode depicted in FIG. 4 to the sub-screen image mode. Specifically, the sub-screen image display control section 52 displays a manipulation guiding area G2 in the circumference of the sub-screen image S in which the sub-content is displayed. The manipulation guiding area G2 is an area surrounding the sub-screen image S and is an area for presenting the fact that the manipulation for the sub-screen image S is currently allowed to the user. Further, the sub-screen image display control section 52 displays guide information for presenting the contents of the manipulation that can be made for the sub-screen image S to the user within the manipulation guiding area G2. In order to draw attention of the user, the manipulation guiding area G2 desirably has a background color having high chroma. By performing such emphasized display, the sub-screen image display control section 52 can clearly present the fact that the transition to the sub-screen image mode is made to the user.

In addition, when the main screen image mode is switched over to the sub-screen image mode, in displaying the manipulation guiding area G2, the sub-screen image display control section 52 may move the arrangement position of the sub-screen image S itself within the main screen image M. In the example of FIG. 5, the arrangement position of the sub-screen image S is moved upward compared with the case of FIG. 4, information for guiding the manipulation to the user is displayed in the space generated by the movement. In this case, the sub-screen image S is arranged at a position closest to a lower end of the outer circumference of the main screen image M, and the arrangement position of the sub-screen image S is moved in a direction away from the lower end of the main screen image M at the time of the switchover to the sub-screen image mode. In contrast, in a case where the sub-screen image S is arranged in the vicinity of an upper end within the main screen image M, the sub-screen image S may be moved downward (in a direction away from the upper end within the main screen image M) at the time of the switchover to the sub-screen image mode. In this manner, at the time of the transition to the sub-screen image mode, the sub-screen image S is moved in the direction away from the outer circumference of the main screen image M (i.e., in the direction approaching the center), resulting in that it is possible to cause the attention of the user to be directed to the sub-screen image S.

Further, when the switchover to the sub-screen image mode is performed, the sub-screen image display control section 52 may perform display control such that the displayed contents in the main screen image M, except for the sub-screen image S and the manipulation guiding area G2, is made less conspicuous. Specifically, for example, the sub-screen image display control section 52 executes image processing for the video displayed in the main screen image M, such as converting the video into a monochromatic video, blurring, or increasing transparency. Thereby, it is possible to further cause the attention of the user to be directed to the sub-screen image S.

In the sub-screen image mode, the user can perform an instruction manipulation for changing the arrangement position of the sub-screen image S. As guide information for presenting the fact that such an instruction manipulation can be received to the user, an image of an arrow indicating a change direction of the arrangement position is displayed within the manipulation guiding area G2. If the user performs a manipulation for indicating the direction along this arrow, the sub-screen image display control section 52 moves the arrangement position of the sub-screen image S in the indicated direction. For example, in FIG. 5, the sub-screen image S is arranged in the vicinity of the bottom right corner within the main screen image M, and arrows directed to an upward direction and a leftward direction are displayed within the manipulation guiding area G2. In a case where the user depresses the manipulation button allocated to the upward direction, or performs a manipulation on the analog stick for indicating the upward direction, the sub-screen image display control section 52 moves the sub-screen image S to the vicinity of a top right corner within the main screen image M. Moreover, in a case where an indication of the leftward direction is received, the sub-screen image display control section 52 moves the sub-screen image S to the vicinity of a bottom left corner within the main screen image M. With such control, the user can move the sub-screen image S to a position where the sub-screen image S is less liable to get in the way when the user views the displayed contents in the main screen image M.

The sub-screen image display control section 52 may end the display of the sub-screen image S in response to an instruction manipulation made by the user. In the example of FIG. 5, a mark image (a triangular mark in this case) representing the manipulation button allocated to an instruction to end (close) the display of the sub-screen image S is indicated as guide information within the manipulation guiding area G2. If the user manipulates the manipulation button of the manipulation device 20 corresponding to this mark image, the sub-screen image display control section 52 ends the display of the sub-screen image S, and switches the sub-screen image mode over to the main screen image mode.

In addition, the sub-screen image display control section 52 may change not only the arrangement position of the sub-screen image S but also a size or a shape of the sub-screen image S, the positional relation of the sub-screen image S with respect to the entire main screen image M, or the like in response to an instruction manipulation made by the user. In the example of FIG. 5, a mark image (a square mark in this case) representing the manipulation button allocated to an instruction to change such a display layout is indicated as guide information within the manipulation guiding area G2. If the user manipulates the manipulation button of the manipulation device 20 corresponding to this mark image, the sub-screen image display control section 52 changes the display layout of the sub-screen image S.

Figure 6:
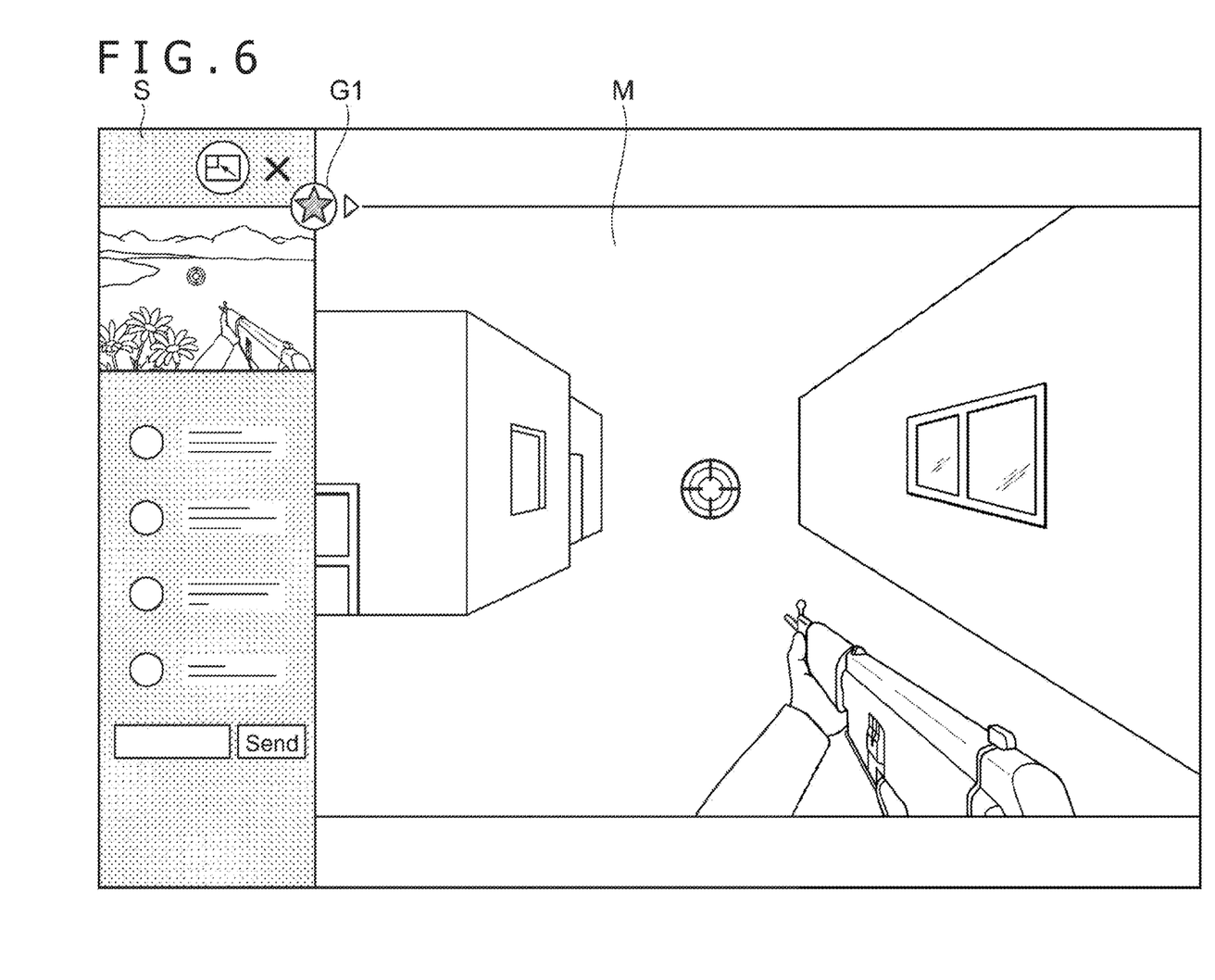
FIG. 6 is a view depicting an example of display in the sub-screen image mode in a case where a sub-screen image is arranged in a different layout.

FIG. 6 depicts a situation in which the sub-screen image S of a shape extending vertically in a narrow strip shape along a left side of the main screen image M is displayed in response to such an instruction to change the display layout. In the example depicted in the figure, the strip-shaped sub-screen image S is arranged and the main screen image M is reduced. Thus, the strip-shaped sub-screen image S and the main screen image M are arranged side by side on the left and the right so as not to be superimposed on each other.

In addition to the sub-content displayed in the sub-screen image S having a small size, various kinds of information associated with the sub-content may be included in the sub-screen image S having such a relatively large size. In the example of FIG. 6, in addition to a distributed video which has been displayed in the sub-screen image S having a small size until then, a comment posted by another viewer for the distributed video is displayed. In addition, a field for posting a new comment is also displayed. The user can perform a manipulation for indicating, for example, a downward direction in the sub-screen image mode to select the field for posting a new comment. Further, the user can input a message in the field, so that the user himself/herself can also post a comment for the distributed video currently displayed within the sub-screen image S.

In addition, various kinds of menu items which the user can select may be included within the sub-screen image S. For example, in a case where a list of musical pieces being reproduced based on the user's selection or a list of reproducible musical pieces is displayed as the sub-content, the sub-screen image display control section 52 may receive from the user a manipulation for selecting an arbitrary musical piece from the list to start reproduction, or a manipulation for pausing a musical piece being reproduced.

Further, in the example of FIG. 6, menu items for receiving a layout change instruction or an instruction to end the display of the sub-screen image S from the user are arranged in the vicinity of an upper side of the sub-screen image S. In this case, these menu items are arranged side by side along a horizontal direction, and the user can select one of these menu items by performing a manipulation for indicating the leftward direction or the rightward direction. In this example, the menu item on the left side in the figure is allocated to the layout change instruction to reduce the sub-screen image S to return the size of the sub-screen image S back to original one as depicted in FIG. 5. In addition, the menu item on the right side is allocated to the instruction to end the display of the sub-screen image S.

In addition, in a state in which the sub-screen image S having a relatively large size including a blank space like the example of FIG. 6 is displayed, since the sub-screen image S is in contact with an outer edge of the display area of the display apparatus 30, when the transition is made to the sub-screen image mode, it is difficult to display such a manipulation guiding area G2 as to surround the circumference of the sub-screen image S. Therefore, when the transition is made to the sub-screen image mode, in order to notify the user of the transition, the sub-screen image display control section 52 may change a background color of the entire sub-screen image S instead of displaying the manipulation guiding area G2. In this case, the background color of the sub-screen image S is preferably the same as the background color of the manipulation guiding area G2. In this manner, the state in which the manipulation can be performed for the sub-screen image S can be presented to the user in a consistent manner before and after the layout change.

Also in the example of FIG. 6, the switchover manipulation guiding image G1 is displayed on the boundary line between the main screen image M and the sub-screen image S. Further, in this example, an image of an arrow mark indicating a change destination is arranged adjacent to the switchover manipulation guiding image G1. FIG. 6 depicts a situation of the sub-screen image mode, and if the function button 23 is manipulated in this state, the switchover to the main screen image mode is performed. For this reason, an image of a rightward arrow (i.e., an arrow pointing to the main screen image M) is displayed on the right side of the switchover manipulation guiding image G1. With this image of the arrow, the user can intuitively understand that the manipulation target is switched over to the main screen image M by manipulating the function button 23 represented by the switchover manipulation guiding image G1. It is to be noted that since the image of the arrow is displayed within the main screen image M, it does not get in the way of the displayed contents of the sub-screen image S which is the manipulation target at that point of time.

Figure 7:
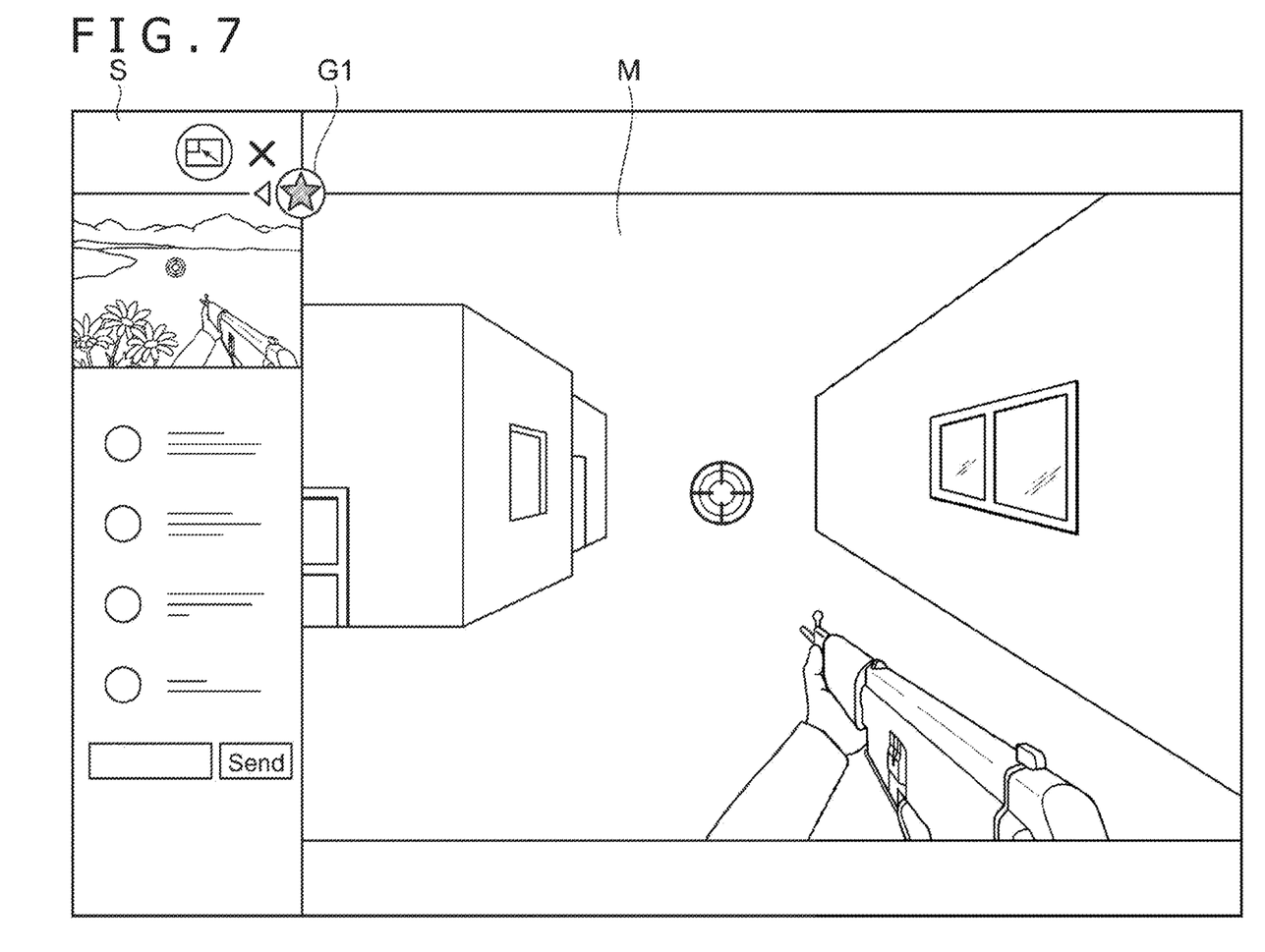
FIG. 7 is a view depicting an example of display in the main screen image mode in a case where a sub-screen image is arranged in a different layout.

If the mode switchover manipulation is performed in this state, the switchover to the main screen image mode is performed. FIG. 7 depicts an example of the display in this state and, contrary to the case of FIG. 6, an image of a leftward arrow (i.e., an arrow pointing to the sub-screen image S) is displayed on the left side of the switchover manipulation guiding image G1. Similarly to the case of FIG. 6, with the image of this arrow, the user can easily grasp that if he/she manipulates the function button 23, the manipulation target is switched from the main screen image M over to the sub-screen image S.

As has been described so far, with the information processing apparatus 10 according to the embodiment of the present invention, in a case where switchover is performed between the mode in which the manipulation for the main screen image M is received and the mode in which the manipulation for the sub-screen image S is received, the user can easily understand which of the screen images is set as the manipulation target, and the manipulability can be improved.

It is to be noted that the embodiment of the present invention is not limited to the one described so far. For example, the displayed contents of the sub-screen image S and the contents of the manipulation for the sub-screen image S in the above description are merely exemplifications. Moreover, a shape and a size of the sub-screen image S, the positional relation of the sub-screen image S with respect to the main screen image M, and the like are also merely exemplifications, and the sub-screen image S may be displayed in various kinds of layouts.

REFERENCE SIGNS LIST

1 Information processing system
10 Information processing apparatus
11 Control section
12 Storage section
13 Interface section
20 Manipulation device
21R, 21L Grip section
22 Touch pad
23 Function button
24R, 24L Manipulation button
25R, 25L Analog stick
30 Display apparatus
51 Main screen image display control section
52 Sub-screen image display control section
53 Manipulation receiving section

The invention claimed is:

1. An information processing apparatus comprising:
a main screen image display control section that displays a main screen image including a main content;
a sub-screen image display control section that displays a sub-screen image inside the main screen image including a sub-content of a kind different from a kind of the main content in a time period same as the main screen image; and
a manipulation receiving section that receives a switchover manipulation from a mode in which a manipulation for the main screen image is received over to a mode in which a manipulation for the sub-screen image is received,
wherein, when a switchover to the mode in which the manipulation for the sub-screen image is received is performed, the sub-screen image display control section displays the sub-screen image in an emphasized manner including: (i) an area having a predetermined background color surrounding an outer periphery of the sub-screen image to highlight the sub-screen image, (ii) guidance information in the area having the predetermined background color, where the guidance information informs the user in such a way as to guide an operation content on the sub-screen, and (iii) a guide image for guiding the switchover manipulation in association with the sub-screen image at a position on a boundary line between the sub-screen image and the main screen image, and on a side close to an outer periphery of the main screen image among outer peripheries of the sub-screen in a mode for receiving an operation on the main screen.

2. The information processing apparatus according to claim 1, wherein the sub-screen image display control section displays the sub-screen image in an emphasized manner by moving an arrangement position of the sub-screen image from an arrangement position in the mode in which the manipulation for the main screen image is received to a position close to a center of the main screen image.

3. The information processing apparatus according to claim 1, wherein the switchover manipulation is achieved by a single press of a button on a controller operated by a user.

4. The information processing apparatus according to claim 3, wherein the sub-screen image display control section displays a guide image for guiding the user to press the button on the controller.

5. The information processing apparatus according to claim 4, wherein the guide image includes an icon having indicia that corresponds to indicia printed on the button.

6. The information processing apparatus according to claim 4, wherein the increased amount of detail in the sub-screen image includes one or more guiding icons, which when invoked by user operation of the controller, cause a change in the size, location and/or detail level of the sub-screen image.

7. An information processing method comprising:
  displaying a main screen image including a main content;
  displaying a sub-screen image inside the main screen image including a sub-content of a kind different from a kind of the main content in a time period same as the main screen image;
  receiving a switchover manipulation from a mode in which a manipulation from a mode in which a manipulation for the main screen image is received over to a mode in which a manipulation for the sub-screen image is received; and
  when a switchover to the mode in which the manipulation for the sub-screen image is received is performed, the method includes displaying the sub-screen image in an emphasized manner including:
  displaying an area having a predetermined background color surrounding an outer periphery of the sub-screen image to highlight the sub-screen image;
  displaying guidance information in the area having the predetermined background color, where the guidance information informs the user in such a way as to guide an operation content on the sub-screen, and
  displaying a guide image for guiding the switchover manipulation in association with the sub-screen image at a position on a boundary line between the sub-screen image and the main screen image, and on a side close to an outer periphery of the main screen image among outer peripheries of the sub-screen in a mode for receiving an operation on the main screen.

8. A non-transitory, computer readable storage medium containing a computer program, which when executed by a computer, causes the computer to perform an information processing method by carrying out actions, comprising:
  displaying a main screen image including a main content;
  displaying a sub-screen image inside the main screen image including a sub-content of a kind different from a kind of the main content in a time period same as the main screen image;
  receiving a switchover manipulation from a mode in which a manipulation from a mode in which a manipulation for the main screen image is received over to a mode in which a manipulation for the sub-screen image is received; and
  when a switchover to the mode in which the manipulation for the sub-screen image is received is performed, the method includes displaying the sub-screen image in an emphasized manner including:
  displaying an area having a predetermined background color surrounding an outer periphery of the sub-screen image to highlight the sub-screen image;
  displaying guidance information in the area having the predetermined background color, where the guidance information informs the user in such a way as to guide an operation content on the sub-screen, and
  displaying a guide image for guiding the switchover manipulation in association with the sub-screen image at a position on a boundary line between the sub-screen image and the main screen image, and on a side close to an outer periphery of the main screen image among outer peripheries of the sub-screen in a mode for receiving an operation on the main screen.

* * * * *